(12) United States Patent
Denison et al.

(10) Patent No.: US 7,495,543 B2
(45) Date of Patent: Feb. 24, 2009

(54) VENDING MACHINES WITH FIELD-PROGRAMMABLE ELECTRONIC LOCKS

(75) Inventors: William D. Denison, Naperville, IL (US); Bradley S. Silvers, Yorkville, IL (US); Lawrence D. Brownfield, Downers Grove, IL (US)

(73) Assignee: Micro Enhanced Technology, Inc., Wood Dale, IL (US)

( * ) Notice: Subject to any disclaimer, the term of this patent is extended or adjusted under 35 U.S.C. 154(b) by 649 days.

(21) Appl. No.: 10/997,500

(22) Filed: Nov. 24, 2004

(65) Prior Publication Data

US 2005/0088279 A1    Apr. 28, 2005

Related U.S. Application Data

(63) Continuation of application No. 10/329,626, filed on Dec. 26, 2002, now Pat. No. 6,900,720.

(60) Provisional application No. 60/344,221, filed on Dec. 27, 2001.

(51) Int. Cl.
   *G05B 19/00*    (2006.01)
(52) U.S. Cl. .................. 340/5.23; 340/5.1; 340/5.2; 340/522; 340/5.9; 340/5.61; 340/5.64; 340/5.63; 340/5.6; 340/5.65
(58) Field of Classification Search ............ 340/5.23, 340/5.9, 5.91, 5.92, 5.6, 5.61, 5.64, 5.63, 340/5.65, 5.1, 5.2, 5.22; 700/237; 705/16, 705/17, 18
See application file for complete search history.

(56) References Cited

U.S. PATENT DOCUMENTS

| | | | |
|---|---|---|---|
| 4,031,434 A | 6/1977 | Perron et al. | |
| 4,167,104 A | 9/1979 | Bond | |
| 4,268,076 A | 5/1981 | Itoi | |
| 4,369,442 A | 1/1983 | Werth et al. | |
| 4,509,093 A | 4/1985 | Stellberger | |
| 4,594,637 A | 6/1986 | Falk | |
| 4,779,090 A | 10/1988 | Micznik et al. | |
| 4,829,296 A * | 5/1989 | Clark et al. ............. | 340/5.65 |
| 4,926,996 A | 5/1990 | Eglise et al. | |
| 5,339,250 A | 8/1994 | Durbin | |
| 5,349,345 A | 9/1994 | Vanderschel | |

(Continued)

OTHER PUBLICATIONS

U.S. Appl. No. 10/329,626, filed Dec. 26, 2002.

*Primary Examiner*—Brian A Zimmerman
*Assistant Examiner*—Vernal U Brown
(74) *Attorney, Agent, or Firm*—Leydig, Voit & Mayer, Ltd.

(57) ABSTRACT

A vending machine uses a field-programmable electronic lock that learns a key code from a corresponding electronic key. The electronic lock has a learning process activation device that is accessible when the door of the vending machine is in the open position. Using the learning process activation device, a service person activates the electronic lock to perform a key code learning operation, in which the electronic lock receives a key code transmitted from an electronic key and stores the key code in a non-volatile memory for future access control of the vending machine. Data encryption is employed in the communications between the key and the lock to ensure the security of the communications. A communication device installed in the vending machine for communicating with a home base computer allows the operation of the electronic lock to be remotely controlled for access control and auditing purposes.

6 Claims, 16 Drawing Sheets

U.S. PATENT DOCUMENTS

| | | | |
|---|---|---|---|
| 5,392,025 A | 2/1995 | Figh et al. | |
| 5,394,718 A | 3/1995 | Hotzl | |
| 5,473,236 A * | 12/1995 | Frolov | 318/286 |
| 5,477,041 A * | 12/1995 | Miron et al. | 340/5.28 |
| 5,575,515 A | 11/1996 | Iwamoto et al. | |
| 5,602,536 A | 2/1997 | Henderson et al. | |
| 5,625,349 A | 4/1997 | Disbrow et al. | |
| 5,636,881 A | 6/1997 | Stillwagon | |
| 5,745,044 A * | 4/1998 | Hyatt et al. | 340/5.23 |
| 5,774,053 A | 6/1998 | Porter | |
| 5,813,257 A | 9/1998 | Claghorn et al. | |
| 5,841,866 A | 11/1998 | Bruwer et al. | |
| 5,886,644 A | 3/1999 | Keskin et al. | |
| 6,005,487 A | 12/1999 | Hyatt, Jr. et al. | |
| 6,038,491 A | 3/2000 | McGarry et al. | |
| 6,068,305 A | 5/2000 | Myers et al. | |
| 6,318,137 B1 | 11/2001 | Chaum | |
| 6,345,522 B1 | 2/2002 | Stillwagon et al. | |
| 6,401,059 B1 | 6/2002 | Shen et al. | |
| 6,437,740 B1 * | 8/2002 | De Champlain et al. | 342/417 |
| 6,483,424 B1 | 11/2002 | Bianco | |
| 6,496,101 B1 | 12/2002 | Stillwagon | |
| 6,525,644 B1 | 2/2003 | Stillwagon | |
| 6,575,504 B2 | 6/2003 | Roatis et al. | |
| 6,581,986 B2 | 6/2003 | Roatis et al. | |
| 6,584,309 B1 * | 6/2003 | Whigham | 455/414.1 |
| 6,684,671 B2 | 2/2004 | Beylotte et al. | |
| 6,867,685 B1 * | 3/2005 | Stillwagon | 340/5.64 |
| 6,874,828 B2 | 4/2005 | Roatis et al. | |
| 6,975,202 B1 * | 12/2005 | Rodriguez et al. | 340/5.25 |
| 2002/0014950 A1 | 2/2002 | Ayala et al. | |
| 2002/0024418 A1 | 2/2002 | Ayala et al. | |
| 2002/0024420 A1 | 2/2002 | Ayala et al. | |
| 2003/0030539 A1 | 2/2003 | McGarry et al. | |
| 2003/0127866 A1 | 7/2003 | Martinez et al. | |
| 2003/0128101 A1 | 7/2003 | Long | |

* cited by examiner

KEYCODES

* A,B,C, are different encryption algorythms

VENDING MACHINES WITH FIELD-PROGRAMMABLE ELECTRONIC LOCKS

RELATED APPLICATION

This application is a continuation of U.S. application Ser. No. 10/329,626, filed Dec. 26, 2002, which claims the priority of U.S. Provisional Application No. 60/344,221, filed Dec. 27, 2001.

TECHNICAL FIELD

This invention relates generally to vending machines, and more particularly to vending machines equipped with electronic locks.

BACKGROUND OF THE INVENTION

Vending machines are widely used in various locations as automated means for selling items such as soft drinks, snacks, etc. Traditional vending machines are equipped with mechanical locks, which can be unlocked with a corresponding mechanical key to open the door of the machine to allow reloading of goods and collection of money.

One significant problem with conventional vending machines is the difficulties in managing the distribution and usage of the keys to ensure the security of the locks on the vending machines. The process of collecting money from the vending machines scattered at different places is a very manpower-intensive operation that requires many employees to go into the field with numerous mechanical keys for operating the locks on the vending machines. It requires a considerable amount of attention and efforts to manage and track the distribution of the keys to the field workers to keep the keys secure.

Moreover, the mechanical keys and lock cores of vending machines are a point of attack for vandals. The keys can be lost or copied easily, and the stolen or copied keys may then be used by an unauthorized person to access the machines, and it is difficult to discover such misuses and security breaches. Also, a skilled vandal can easily pick or drill-out the lock core tumblers and measure the key cuts of the lock core tumblers to re-produce a like key and compromise the security. In the event a security breach is identified, the mechanical lock cores of the affected vending machines typically have to be manually replaced, which is a time-consuming and very costly process. Furthermore, mechanical keys and locks are devices that cannot be partially limited in operation they operate indefinitely if in use. Also, they do not have the ability to record access operation attempts of their operation.

SUMMARY OF THE INVENTION

In view of the foregoing, the present invention provides a vending machine with a field-programmable electronic lock. The electronic lock can learn a key code from a corresponding electronic key. Alternatively, the electronic lock can learn that it should be accessed by an electronic switch controlled by a mechanical lock that can be opened with an associated mechanical key. The electronic lock has a learning process activation device that is accessible only when the door of the vending machine is in the open position. Using the learning process activation device, a service person sets the electronic lock in a learning mode, in which the electronic lock receives a key code transmitted from an electronic key, and stores the key code in a non-volatile memory for future access control of the vending machine. In the case where the lock access is to be controlled by the switch-lock combination, during the learning process the electronic lock controller receives an electronic closure signal from the switch. The lock thus learns that it is to open the door of the vending machine in response of the switch signal in lieu of reception of key codes from electronic keys.

The key-learning process in accordance with the invention allows electronic locks in vending machines to be easily and inexpensively programmed in the field. Thus, the electronic locks do not have to be manufactured with pre-defined permanent key codes and are not tied to any specific electronic keys for field use. There is no need to replace any physical part of the electronic lock in this key-learning process to learn a new key code and/or replacing an old key code. In contrast, mechanical locks conventionally used on vending machines have lock cores that have to be manufactured for specific keys, and once manufactured the lock cores cannot be changed. If the mechanical key is lost, the entire lock cores have to be replaced. More than one electronic key can possess a given keycode. The electronic lock on a vending machine can allow more than one keycode to be learned into the lock and used to access the lock.

The use of the field-programmable electronic locks for vending machines provides an effective way to reduce theft and fraud in terms of unauthorized access to the machines. The electronic keys provide a greater level of key security compared to mechanical keys, as they cannot be copied as easily as conventional mechanical keys. The use of non-contact wireless data communication between the key and the lock prevents breeches of security associated with vandals measuring key cuts, copying keys and picking locks. The use of data encryption in the wireless communications between the key and the lock prevents the key code from being copied by electronic monitoring and eavesdropping. The data transmission between the key and lock may be implemented in the infrared range to provide close-proximity highly directional communication of secure codes to further prevent eavesdropping of the security codes and to prevent accidental unlocking of locks.

The use of programmable electronic locks on vending machines and the associated electronic keys also provides advantages in terms of significant reduction in the costs associated with managing the distribution of the keys for unlocking the machines and the monitoring of the usage of the keys. Key IDs in addition to the key codes used in accessing the lock may be used to distinguish keys having the same key codes. Customized access limitations may be programmed by a supervisor into the electronic keys to restrict when and how they can be used to access the vending machines. Each key may also be programmed with a specific list of lock IDs identifying the electronic locks on vending machines that the key is allowed to unlock.

In accordance with one aspect of the invention, a history of access attempts may be stored in each of the electronic key and the electronic lock for audit purposes. The key may store the access history each time it is used to access an electronic lock on a vending machine. Likewise, each electronic lock on a vending machine may store audit data regarding the access attempts directed to it. The audit data may be transferred from the electronic lock to the electronic key during an unlocking operation, and the audit data of different vending machines collected by an electronic key can be later downloaded to a computer for analysis.

In accordance with another aspect of the invention, the electronic lock may accept more than one type of keys and corresponding key codes. The different key types may be associated with different levels of security of the unlocking operations and the type of data transmitted between the key and lock during the unlocking operations.

In accordance with another aspect of the invention, the electronic lock in a vending machine can work in conjunction with an electronic communication device in the vending machine that is in wireless communication with a home base to accomplish many of the same access control, auditing, and additionally some inventory and money settlement processes.

DETAILED DESCRIPTION OF EMBODIMENTS OF THE INVENTION

Figure 1:
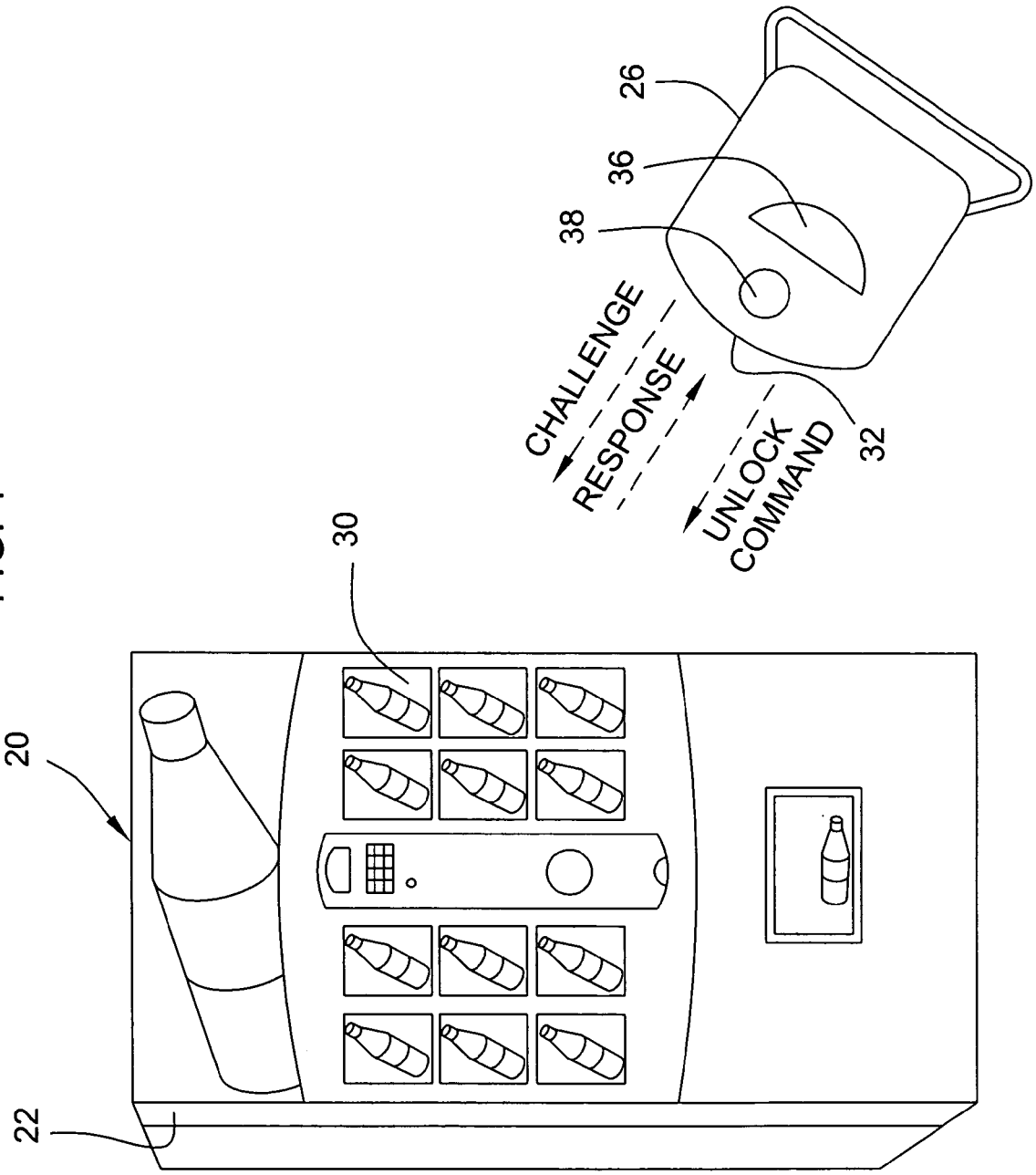
FIG. 1 is a schematic view of a vending machine and an electronic key for opening an electronic lock inside the vending machine.

Referring now to the drawings, the present invention is directed to an electronic lock system for use in vending machines that provides significantly improved security and ease of management over conventional vending machines equipped with mechanical locks. The term "vending machine" as used herein means a device that performs a money transaction, which may involve the insertion of cash or commercial paper, or the swiping of a credit and/or debit card, and may (but not required to) dispense an item or items or provide functions in response to the money transaction. In this regard, this term is meant to cover broadly machines commonly used for vending drinks and snacks, ATM stations, change machines, toll machines, coin-operated laundry machines, video arcades, etc. FIG. 1 shows, as an example, a vending machine 20 with an embodiment of an electronic lock of the invention mounted therein. The vending machine 20 has a front panel 22 or door that can be opened when the electronic lock is unlocked with a properly programmed electronic key 26. It will be appreciated that the vending machine and the electronic key are not shown to scale in FIG. 1, and the view of the electronic key is significantly enlarged with respect to the vending machine to show its features.

The key 26 and the lock preferably communicate with each other wirelessly, which may be via an infrared or radio frequency (RF) channel. In a preferred embodiment, the wireless communications between the key and the lock is via infrared transmissions. The infrared medium is preferred because it is directional and short range, and the infrared circuitry in the lock is not sensitive to the metal cabinet enclosure of the vending machine. Thus the vending machine will less likely be opened accidentally if the key is accidentally operated of if the key is operated to unlock another vending machine nearby. In addition, the infrared light can travel through the selection buttons on the vending machine. This allows the infrared transceiver of the electronic lock to be positioned behind a selection button 30 of the vending machine, as illustrated in FIG. 1. To that end, the vending machine 20 has an infrared transceiver disposed to receive infrared transmission through its front panel 22, and the electronic key 26 has an infrared transceiver at one end 32. As shown in FIG. 1, in one implementation, the electronic key 26 has a very simple profile, having only a "START" button 36 that can be activated by a user for lock opening and key code learning operations. In a preferred embodiment, the "START" button 36 need not be continuously pressed in order for the key to transmit the encrypted code to the lock. Instead, the user only has to only momentarily press the button 36, and the key will automatically stop transmitting after a few seconds, thus the key will not transmit indefinitely and deplete the battery if the button is stuck down. The electronic key 26 also has a light-emitting diode (LED) 38 exposed through a hole in the housing of the key for indication the operation status of the key.

Figure 2:
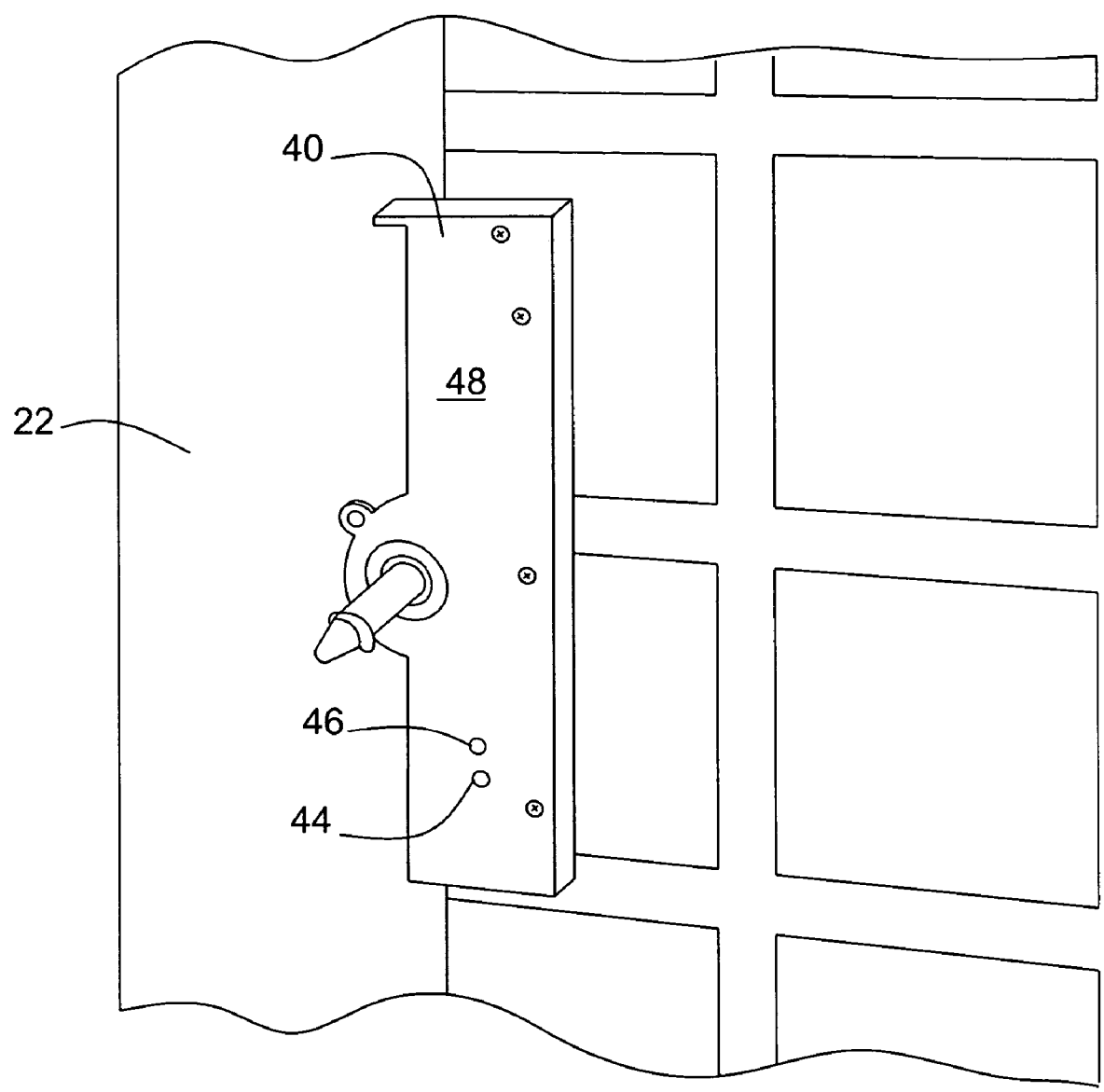
FIG. 2 is a perspective view of an electronic lock assembly mounted on a door of a vending machine.

In accordance with an aspect of the invention, the electronic lock assembly is mounted inside the vending machine 20 to prevent unauthorized access and tampering. It can be physically accessed only when it is properly unlocked and the door 22 or front panel of the vending machine is opened. In one embodiment, as shown in FIG. 2, the electronic lock assembly 48 is mounted on the inside of the door 22, and opening the door of the vending machine exposes the lock assembly housing 40. The electronic lock 48 includes a lock shaft 42 that engages into a corresponding receptacle in the body of the vending machine to prevent the door from being opened when it is in a locked position. The electronic circuit of the lock resides in the housing 40 of the lock assembly. The housing 40 has two holes. Behind one hole 44 is a "LEARN" switch connected to the electronic lock circuit. This switch can be accessed and pressed down with a thin object, such as a screwdriver or a car key. Behind the other hole 46 is a light-emitting diode (LED), which servers as a means for providing an indication of the operational state of the electronic lock during a key code learning operation or a lock opening operation, as will be described in greater detail below.

Figure 3:
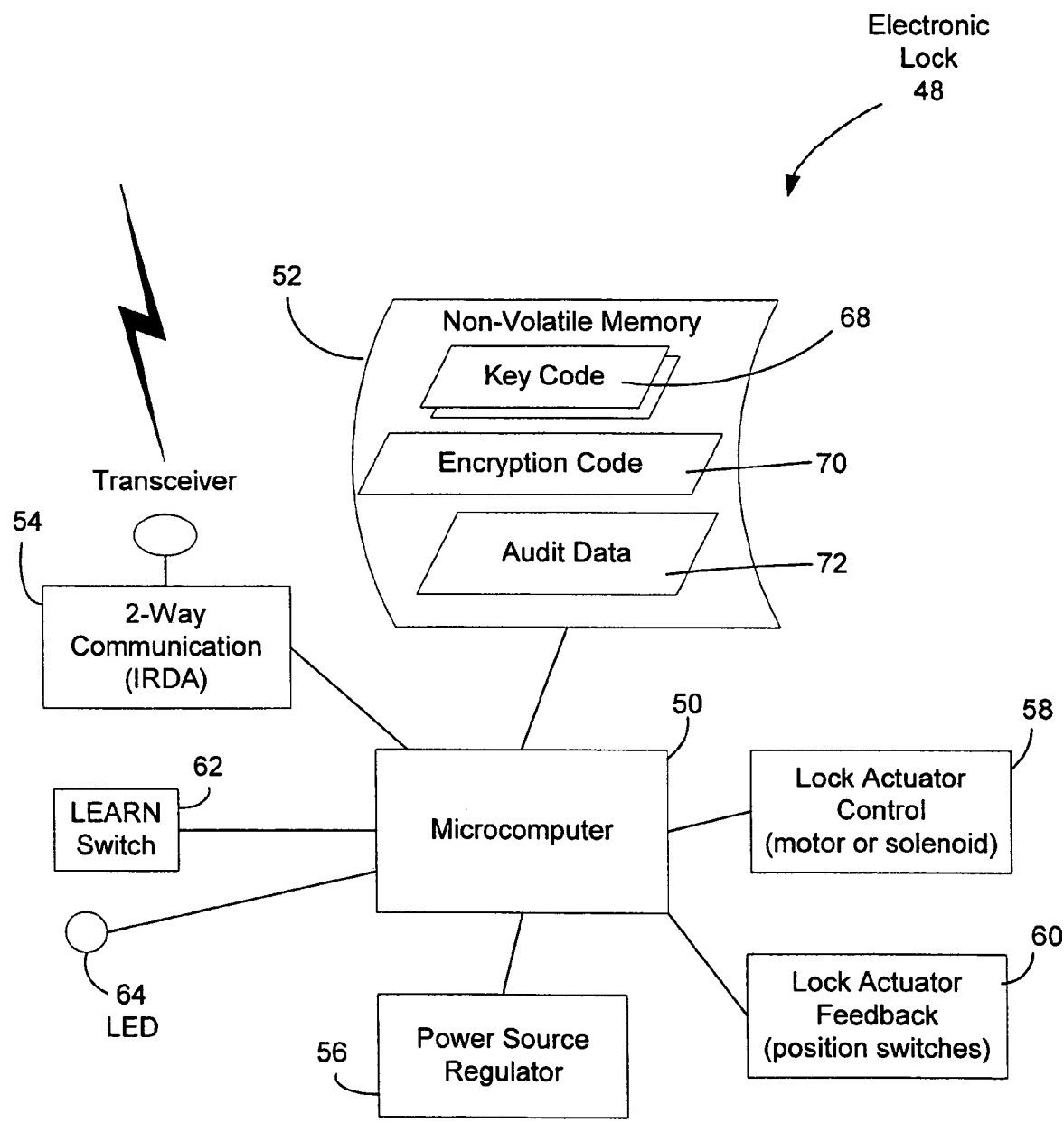
FIG. 3 is a block diagram showing electronic circuit components of an electronic lock used in a vending machine.

Turning now to FIG. 3, in one embodiment, the circuit of the electronic lock 48 comprises a microcomputer 50, a non-volatile memory 52, a half-duplex IRDA infrared communication interface 54 for communicating with an electronic key, a power supply voltage regulator 56, a lock motor or solenoid control circuit 58, position feedback switches 60, a learn switch 62 as mentioned above, and the LED 64 for state indication. The non-volatile memory is for storing key codes 68, encryption codes 70, and audit data 72, as will be described in greater detail below.

In an alternative embodiment, the vending machine with the electronic lock is to be accessed using a mechanical key rather than an electronic key. To that end, the electronic lock includes an interface to a combination (the "switch-lock" combination) of an electrical switch 74 and a mechanical lock 76 that has a cam for moving the switch into a closed or open position. The electrical switch 74 is normally in an open state and is closed when the mechanical lock 76 is opened using an associated mechanical key 78. The open/close state of the switch 76 is detected by the microcomputer 50 and is used to determine whether the mechanical lock 76 is opened or closed. T The microcomputer 50 is programmed to unlock the door 22 of the vending machine 20 in response to the closing of the switch contact caused by unlocking of the mechanical lock 76 using the mechanical key 78. Thus, the unlocking process does not involve the passing of a key code between the electronic lock and an electronic key. Accordingly, as described in greater detail below, during a learning process, the electronic lock learns that it is to be accessed using a mechanical key instead of an electronic key with a key code.

Figure 4:
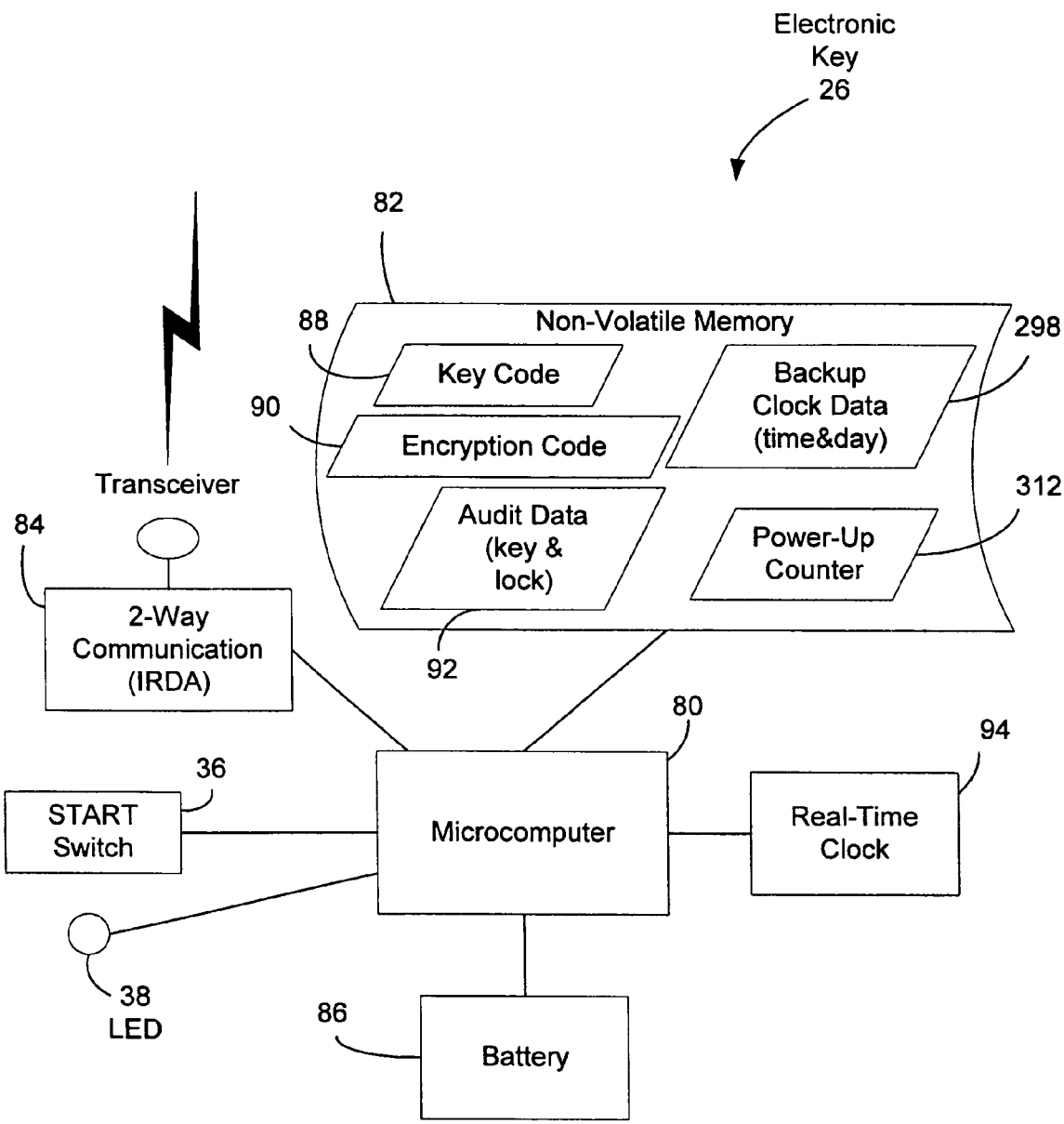
FIG. 4 is a block diagram showing electronic circuit components of an electronic key.

As shown in FIG. 4, in one embodiment, the electronic key 26 includes a microcomputer 80, a non-volatile memory 82, a half-duplex IRDA infrared communication interface 84 for communicating with the electronic lock of a vending machine or with a computer for programming the key, a power source (e.g., a battery) 86, a real-time clock integrated circuit (IC) 94 for generating data indicating the date and time, and the "START" switch 36 and the LED light 38 as mentioned above. The non-volatile memory 82 is for storing a key code 88, encryption codes 90, and audit data 92 generated by the key and/or downloaded from vending machines operated using the key, as will be described below.

The key codes in the keys and the locks of the vending machines are used to define the security and access control strategy of the electronic lock system. Each electronic key 26 has a key code 88 stored therein, and the same key code is stored in the memory 52 of the electronic lock in each vending machine to be operated with the electronic key. During each access attempt, the key code in the electronic key is transferred from the key to the electronic lock using a secured communication method. The electronic lock can be unlocked if the key code it receives from the electronic key matches the key code stored in the memory of the lock.

Figure 5A:
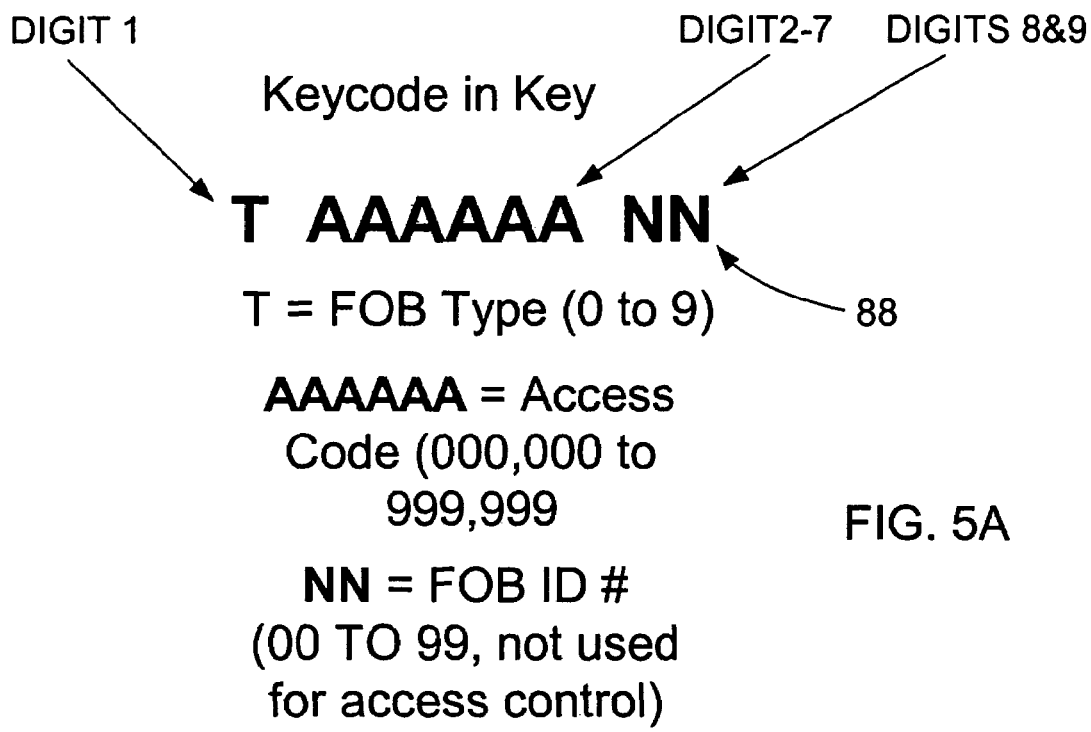
FIGS. 5A and 5B are schematic diagrams showing key codes stored in the memories of an electronic key and an electronic lock, respectively.

In one implementation as shown in FIG. 5A, a key code 68 stored in an electronic key includes seven (7) digits. The first digit of the key code is used to indicate the type of the key. As the value of the key-type digit may go from 0 to 9, there may be up to 10 total key types. As will be described below, in one embodiment of the electronic lock system, there are three different key-types: low-security key, standard key, and auto-tracking key, which correspond to different levels of security in lock-opening operation and audit data collection. The next 6 digits in the key code are the access code (000,000 to 999,999). In addition to the 7 digits representing the key type and access code, a key code stored in the electronic key additionally includes two lower digits, which may be used as the identification (ID) code of that key. In this example, the key ID may vary from 0 to 99. Thus, there may be up to 100 keys that have the same key type and access code but different key ID numbers.

Figure 5B:
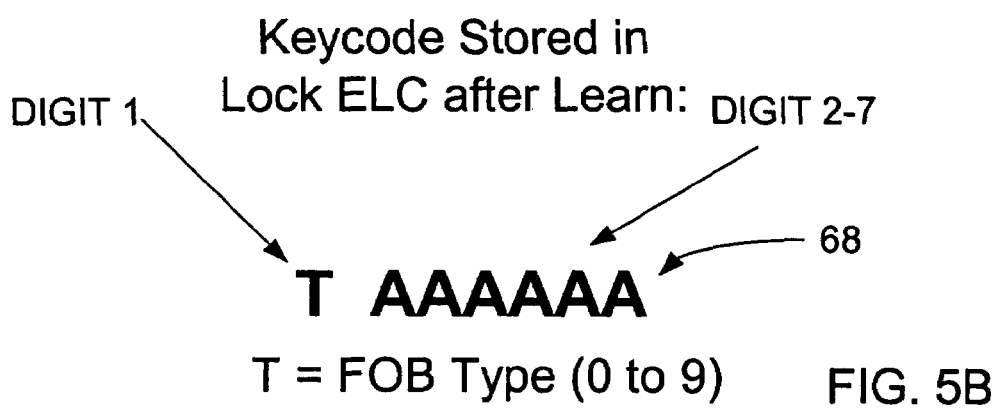

Similarly, as shown in FIG. 5B, a key code 68 stored in the electronic lock has seven (7) digits. The first digit indicates the key type, and the remaining 6 digits are the access code. As mentioned above, there may be up to 10 different key types, and the electronic lock may be programmed to accept a number of key codes of different key types.

In accordance with a feature of the invention, the electronic lock 48 of the vending machine 20 is field-programmable. In other words, the key code or key codes of the electronic lock 48 can be programmed (or "learned") into the non-volatile memory 52 of the lock after the vending machine has been installed in a given location. In a preferred embodiment, the electronic keys to be used to operate the vending machines are programmed with a permanent key code at the factory and ordered by the users of the electronic locks. In the example given above, the users may order up to 100 keys with the same access code. In contrast, the electronic locks to be used in the vending machines are not programmed with any customer-specific key code. Instead, the electronic locks are programmed with a universal code at the factory. The "universal code" is the code put in the lock by the manufacturer of the lock or the vending machine, and is used by the customers to unpack and open the machines after they receive the machines. Thereafter, the electronic locks are installed in the vending machines, which are then shipped to and set up at their respective operating places. In accordance with the invention, the access control strategy is established by "learning" or transferring the access code of the electronic key to be used to operate the machine into the electronic lock via a secured transfer process.

Figure 12:
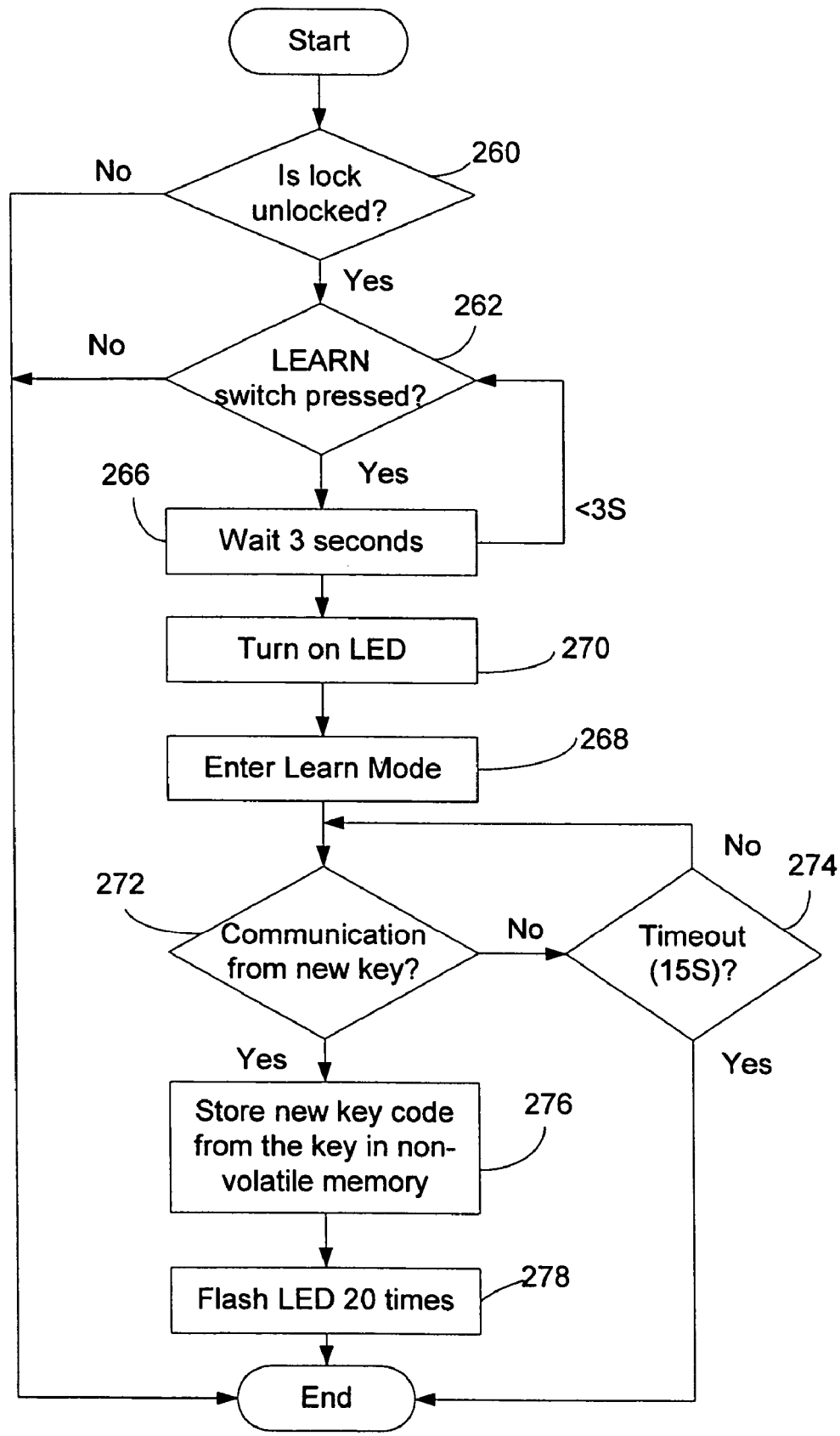
FIG. 12 is a flowchart showing the key code learning process of an embodiment of the electronic lock.

Referring back to FIGS. 1-3 and 12, in one embodiment, to make the electronic lock 48 learn the access code from an associated electronic key 22 or that it is to be controlled by a switch-lock, the service person has to gain access to the LEARN switch 62 of the lock. In addition, it is preferred that the lock microcomputer senses, using the position switches 60, that the lock is in the unlocked position to allow entering into the "learn" mode (step 260 in FIG. 12). To that end, if the door 22 of the vending machine is originally closed and the lock contains the universal key code programmed at the factory, the service person uses a key containing the universal key code to unlock the vending machine and open the door to gain access to the LEARN button of the lock. As mentioned above, the LEARN switch 62 should be at a secured location such that it can be accessed only when the lock is properly unlocked (as opposed to a forced entry) and when the door is open. An assumption in the access control strategy is that an authorized person is servicing and/or reprogramming the lock if the door is properly unlocked and opened. If the microcomputer 50 detects (step 262) that the LEARN switch 62 is pressed (e.g., held for longer than three seconds), it waits (step 266) for the switch to be held in that position for a pre-selected time period (e.g., 3 seconds) and then enters a LEARN process (step 268). In response to the pressing of the learn button, the LED 64 is turn on (step 270). In alternative embodiments, the LEARN switch 62 can be substituted by another activation means that provides a greater level of security, such as a keypad for entering a service authorization code or an electromechanical switch lock that requires a mechanical or another electronic key.

Once the lock 48 is put in the LEARN mode, the service person operates the electronic key 22 containing the desired key code by pressing the button 36 on the key. This causes the key 22 to transmit the key code stored in its memory to the electronic lock. If the electronic key and the lock employ encryption techniques in their communications, the electronic key 22 first encrypts the key code 88 with the encryption codes 90 in its non-volatile memory and then transmits the encrypted code.

The service person is given a pre-selected timeout period (e.g., 15 seconds) to press the key to transmit the key code. To that end, the lock 48 determines whether it has received the transmitted key code (step 272). If it determines (step 274) that a key code transmission is not received within the timeout period, the learning process is terminated. If a key code has been transmitted within the timeout period, the electronic lock 48 receives the transmitted key code via its receiver port 30. If the transmitted code is encrypted, the electronic lock decrypts the received data with the encryption codes 72 in its memory 52. In a preferred embodiment, the encryption codes in the electronic key and the electronic lock are inserted during manufacturing at the factory, and different encryption codes may be used for different vending machine owners (e.g., different soft drink bottlers) so the keys given to one owner may not be learned into and used to access the vending machines of another owner.

If the encryption codes of the key and the lock do not match, the electronic lock will not be able to successfully decrypt the received key code. In that case, the process will end and the lock will not learn the new key code. If, however, the decryption was successful, the lock stores the key code at a proper location in its non-volatile memory 52 according to its key type (step 276). After verifying that the key code is stored correctly in the proper key type location, the lock 48 provides a signal to the service person by flashing the LED 64 to indicate that the LEARN process is successfully completed (step 278). From this point forward, the electronic lock will use the newly learned key code for access control. In other words, it will compare this key code with the key code transmitted from an electronic key to determine whether the door should be unlocked. If there was a key code of the same key type previously stored in the memory 52 prior to the LEARN operation, that old key code will be erased and can no longer be used to access the vending machine.

As mentioned above, in an alternative embodiment, the vending machine equipped with the electronic lock may be accessed with a mechanical key rather than an electronic key. The electronic lock learns that it is to be controlled by the combination of the electrical switch 74 and the mechanical lock in a learning process similar to the one for learning a key code as described above. Specifically, to enable the lock access via the switch-lock, the service person puts the electronic lock into the learn mode by pressing the LEARN switch 62 as described above. Once the electronic lock 48 is in the learn mode, the service person uses the mechanical key 76 to unlock the mechanical lock 76. When the mechanical lock 76 is moved to its unlocked position, its cam closes the contact of the electrical switch 74. The microcomputer 50 of the electronic lock receives the contact-closure signal (i.e., detecting that the electrical switch is closed) and treats the signal as indication that the vending machine is to be accessed using a mechanical key. In response, the microcomputer set its operation mode such that in the future it will unlock the door of the vending machine in response to detecting the closure of the contact of the electrical switch 74. Thus, from this point forward, the vending machine is accessed using the mechanical key 78, which replaces one or more types of electronic keys.

It will be appreciated that the key learning process described above does not require changing or replacing any physical components of the lock. If the electronic key for operating the lock on the vending machine is stolen or lost, the service person will first use a back-up key that has the key code of the key that is lost, or a key that has a different key code that has been previously learned into the lock, to open the door. The service person then uses the key learning process described above to change the key code in the memory of the lock to a new value. This field-programmability of the electronic lock makes key management significantly easier and cost-effective, and provides a greater level of key security compared to mechanical keys. In contrast, with conventional vending machines using mechanical locks, the mechanical keys may be copied or stolen easily, and the entire lock core of each of the vending machines affected has to be replaced in order to change to a different key.

In the illustrated embodiment, one digit in each key code stored in the lock indicates the type of the key, and there may be up to ten different key types. A lock is able to learn one key code for each allowed key type. A key code of a first type may be that learned from a "primary" electronic key for the vending machine, while a key code of a second type may correspond to a different electronic key, such as a "master" key that can be used as a back-up in case the primary key is lost, stolen, broken, or otherwise unavailable.

In a preferred embodiment, as briefly mentioned above, different types of electronic keys (indicated by the different values of the key type digit) are provided that correspond to different levels of security (and the associated complexity of communication) and audit data collection function. The three types of electronic keys are economy key, standard key, switch-lock, and auto-tracking key. The operation of each of these three types of keys is described below.

Figure 6:
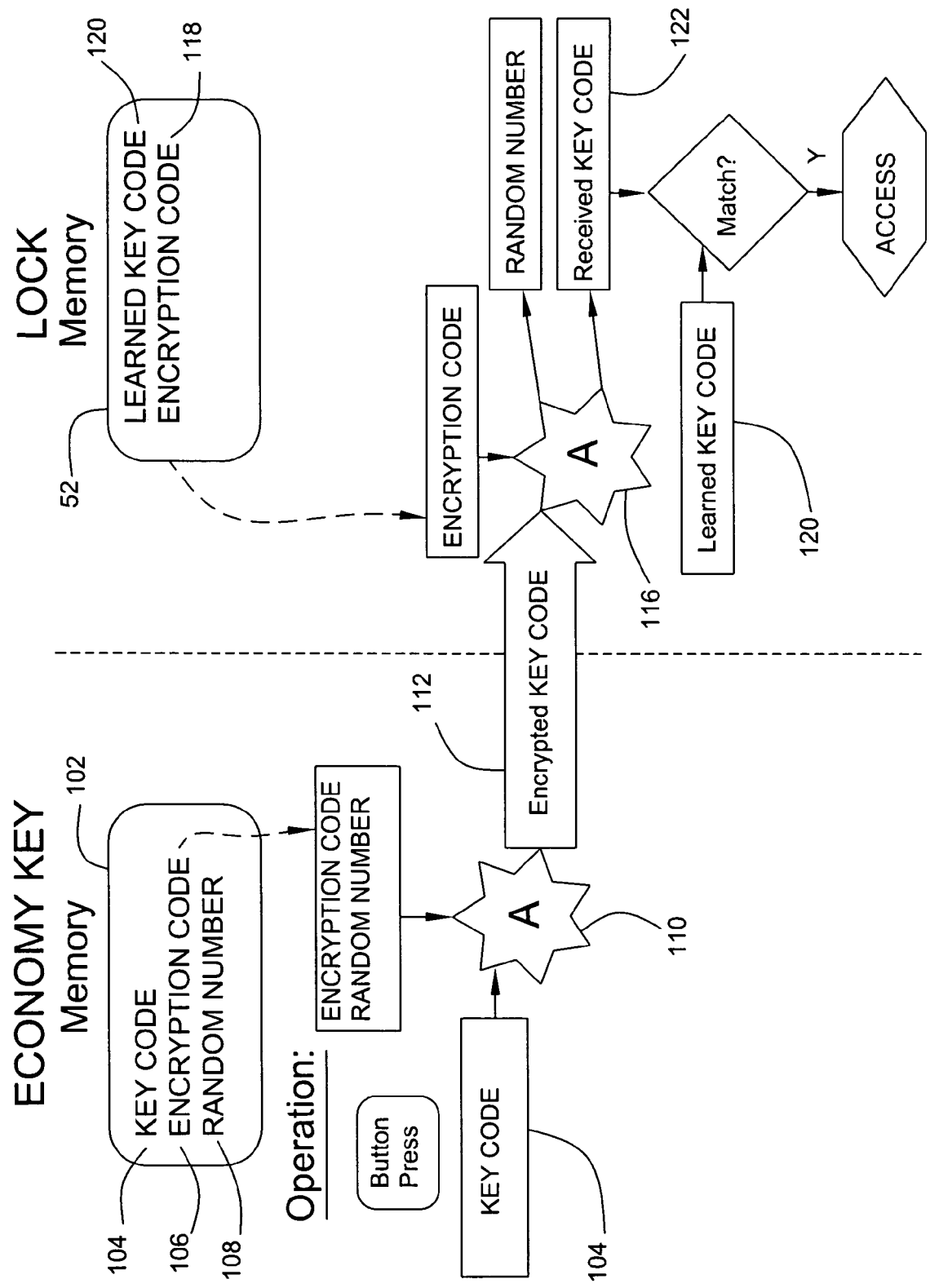
FIG. 6 is a schematic diagram showing the transmission of data between an electronic lock on a vending machine and an electronic key during a simplified unlocking process.

Referring to FIG. 6, the economy key employs a simple one-way communication process for interacting with a corresponding electronic lock on a vending machine. Since the communication process is simpler and the one-way communication does not require a receiver in the key, the key can be build at a lower cost. As shown in FIG. 6, the memory 102 of the economy key contains a key code 104, an encryption code 106, and a random number 108. In a preferred embodiment, the key starts with a given value of the random number, and the random number changes every time the key cycles through a key code transmission. When a user activates the key by pressing the button on the key, the key uses the encryption code to encrypt (step 110) the key code 104 together with the random number 108, and transmits the encrypted number 112 to the electronic lock. When the electronic lock receives the transmitted encrypted data, it decrypts (step 116) the data with the encryption code 118 in its memory 52. The lock then retrieves the key code 122 from the decrypted data and compares it with the key code 120 of the same type in its memory. If the two key codes do not match, the process ends. If they match, the electronic lock proceeds to unlock the door of the vending machine.

Figure 7:
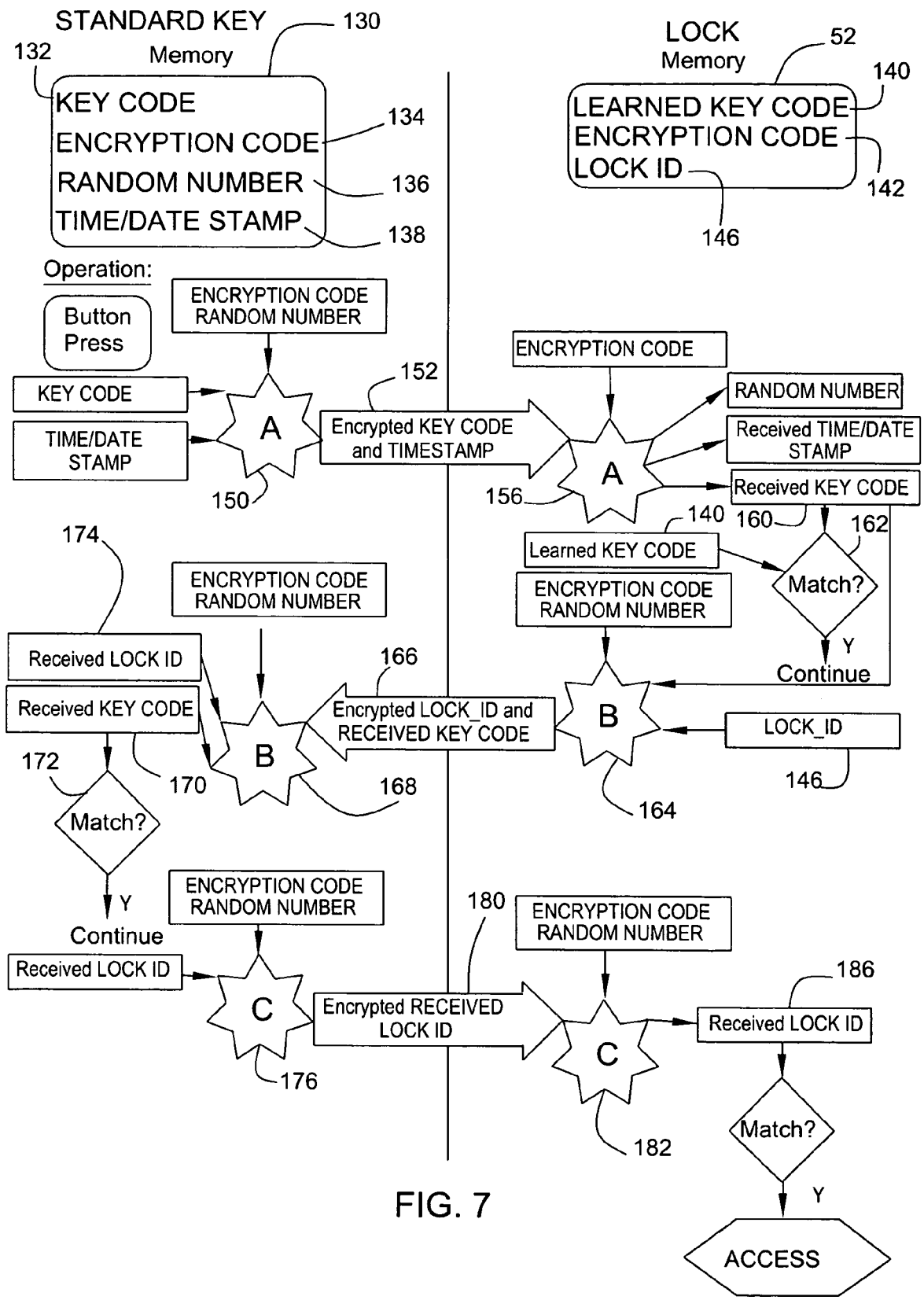
FIG. 7 is a schematic diagram showing communications between an electronic lock on a vending machine and an electronic key during an unlocking process that has higher security than the process in FIG. 6.

In comparison with the economy key, the standard key provides a more secure unlocking process that requires 2-way encrypted communications between the key and the electronic lock. The 2-way communications is in the form of a bi-directional challenge-response process. Referring to FIG. 7, the memory 130 of the key contains the key code 132, the encryption code 134, a real-time clock timestamp 136, and a random number 138. Similarly, the memory 52 of the electronic lock of the vending machine contains a learned key code 140, the encryption code 142, and an ID 146 of the electronic lock. When the service person presses the transmission button on the electronic key, the electronic key encrypts (step 150) the key code 132 in its memory together with the time stamp 136 and the random number 138, and transmits the encrypted key code and timestamp to the electronic lock of the vending machine. The electronic lock receives the transmitted data 152 through its infrared communication interface and decrypts (step 156) the received data with the encryption code 142 in its memory. Next, the electronic lock compares (step 162) the decrypted key code 160 with the key code 140 of the same type in its memory. If the two key codes don't match, the process ends, and the door will not be unlocked. In that case, the electronic lock sends a code to the key to indicate that the key has tried an incorrect key code.

If the two key codes match, the process continues and enters a second phase in which the electronic lock transmits data to the electronic key. Specifically, the lock encrypts (step 164) the key code, the lock ID 146, and the random number. It then transmits the encrypted key code, lock ID, and the random number (originally sent by the key) to the electronic key. The electronic key receives the encrypted data 166 and decrypts (step 168) the data to retrieve the key code and the lock ID. If the key determines (step 172) that the key code 170 returned by the lock matches the key code 132 in the memory of the key, it stores data regarding the access event, including the lock ID, in an audit trail data portion of the key's memory for audit purposes.

The key then proceeds to the third phase of the unlocking process, in which the key communicates to the lock to allow access. To that end, the key encrypts (step 176) the received lock ID and transmits the encrypted lock ID and random number to the lock. The lock receives the transmitted data 180 and decrypts (step 182) the data to retrieve the lock ID. If the received lock ID 186 matches the lock ID 146 stored in the memory of the lock, the microcomputer of the lock proceeds to unlock the door of the vending machine.

The unlocking operation described above has several advantages. It allows the transfer of the lock ID and the key codes between the electronic key and the lock on the vending machine without repeating numbers or a distinguishable pattern of numbers in case of eavesdropping of repeated access attempts. It also prevents a transfer of data between the key and the lock with different encryption codes. Further, it provides a consistent and secure means of data transfer between the key and the lock for a condition where many keys with the same key code will be expected to communicate with many locks on different vending machines containing that key code. This bi-directional challenge-response encryption scheme provides no risk of the keys and the locks going out of sequence, which is a common problem with unidirectional rolling-code encryption systems.

Figure 8:
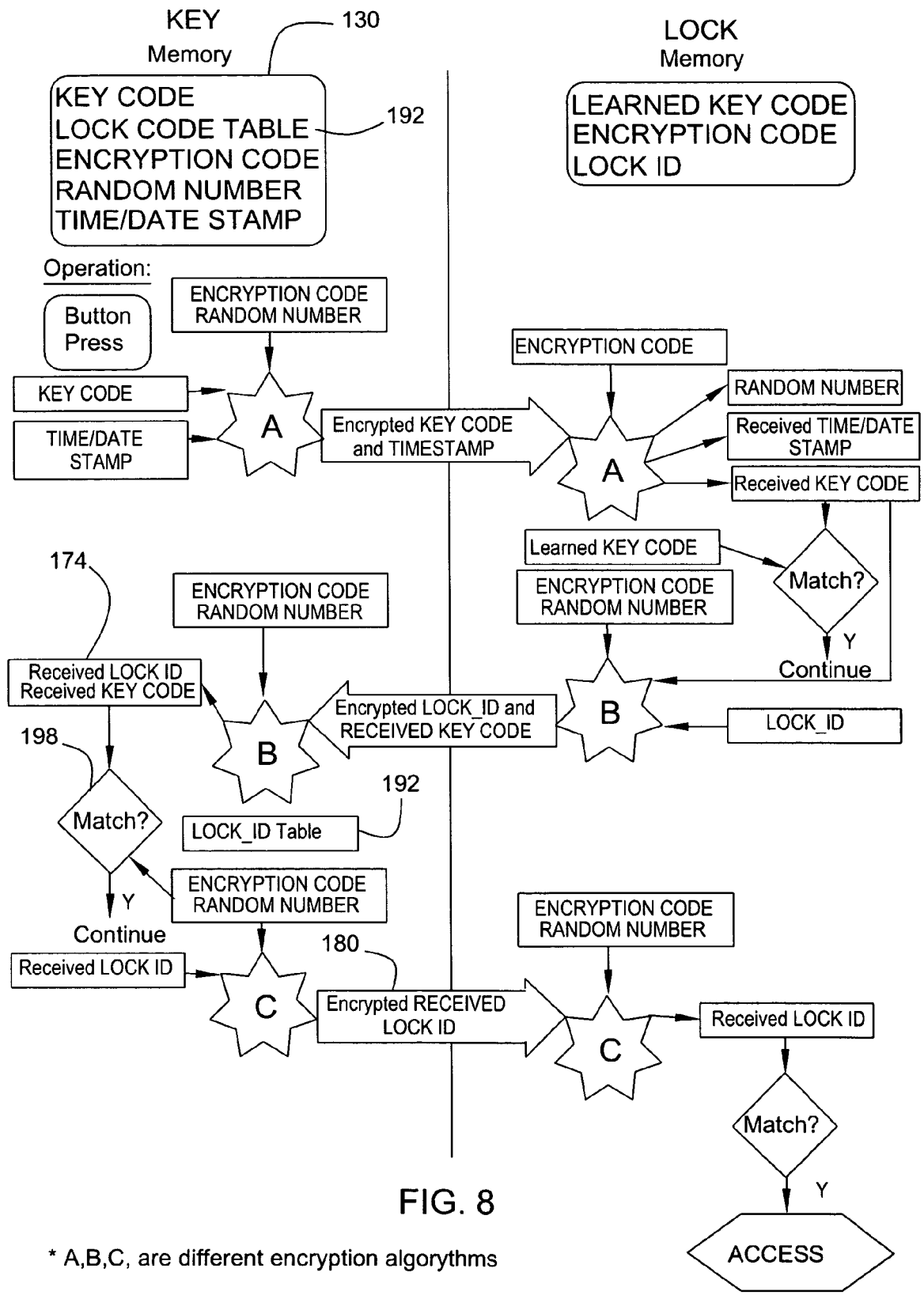
FIG. 8 is a schematic diagram showing communications between an electronic lock on a vending machine and an electronic key during an unlocking process similar to that FIG. 7 but with a step of checking the lock ID for access control.

The lock ID code is used in the unlocking operation described above for generating audit data for audit trail identification purposes and also for data transfer encryption purposes. In an alternative embodiment, however, it is also be used to provide a method for controlling which vending machines a key is allowed to access. In this method, there may be many keys containing the same key code, and there may be many vending machines that have "learned" the same key code. It is possible, however, to specify which vending machines a given key is allowed to access so that a single key cannot open all the vending machines. Referring to FIG. 8, this is accomplished by loading a list of lock ID codes 192 into the memory 130 of that key prior to operation. During an unlocking operation, the key receives a lock ID 174 from the electronic lock on the vending machine and compares the received lock ID with the list of lock IDs 192 in its memory. Only if it is determined (step 198) that the received lock ID 174 matches one of the lock IDs in the list will the key proceed to send the unlock command signal (e.g., the transmission 180 in the third phase) to the electronic lock. As shown in FIG. 8, the unlocking process is otherwise similar to that shown in FIG. 7. This method of access control provides supervisors of the operation the flexibility of allowing or disallowing a given key to access selected vending machines.

In an alternative embodiment, an electronic key may also be programmed with other types of limits of operation of the key. For instance, the key may be programmed with limit registers that contain values chosen by a supervisor to limit the operation of that particular key. In a preferred embodiment, the limit registers 200 (FIG. 4) are part of the non-volatile memory 52. The operation limits include, for example, time of data, date, number of days, number of accesses, number of accesses per day, etc. When the user of the key presses the button on the key to initiate a key code transmission, the microcomputer of the key first compares the limits set in the registers with a real-time clock in the key and an access counter in the key memory. If any of the limits is exceeded, the key will not transmit the key code to the electronic lock and will terminate the operation.

Figure 9:
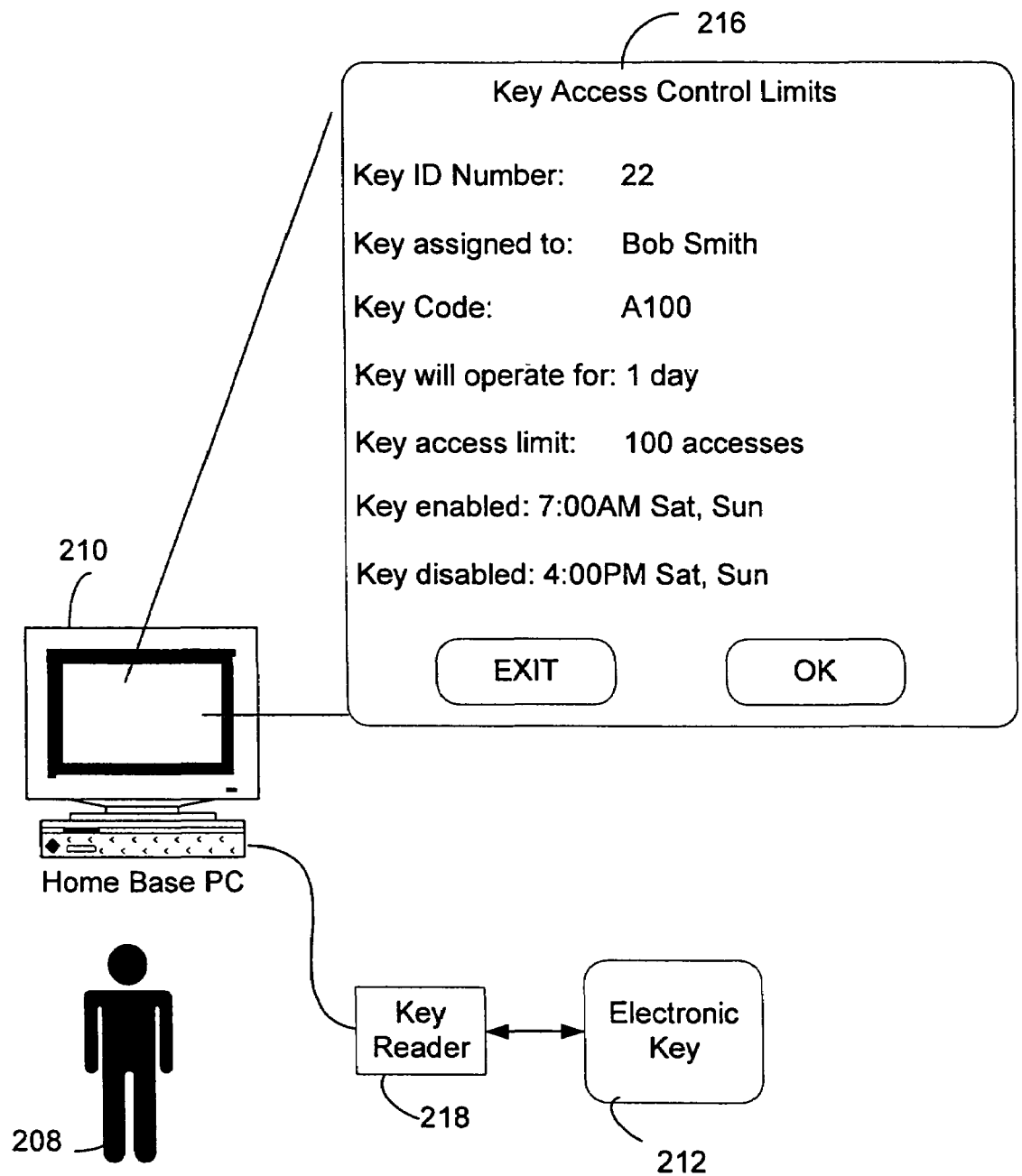
FIG. 9 is a schematic diagram showing a computer used to program operational limitations into an electronic key.

Referring to FIG. 9, the key operation limits may be set by the supervisor 208 of the employee that uses the electronic key 212 to access vending machines in the field. The limits can be selected by using a personal computer (PC) 210 with the appropriate software program. The limits for each key may be customized depending on, for instance, the work schedule or habits of the employee to whom the key is given. For illustration purposes, FIG. 9 shows an exemplary user interface screen 216 for prompting the user 208 to enter the limits. After the limits are selected on the PC 210, they are loaded from the PC into the operation limit registers in the electronic key 212 in a communication process between a key read/write device 218 and the key. During this communication process, other types of data, such as data for updating the real-time clock in the key, may also be loaded into the key. Also, the communication process may be used to transfer data, such as the audit trail data collected from vending machines by the key during previous field operations, from the electronic key 212 to the PC 210.

Figure 10:
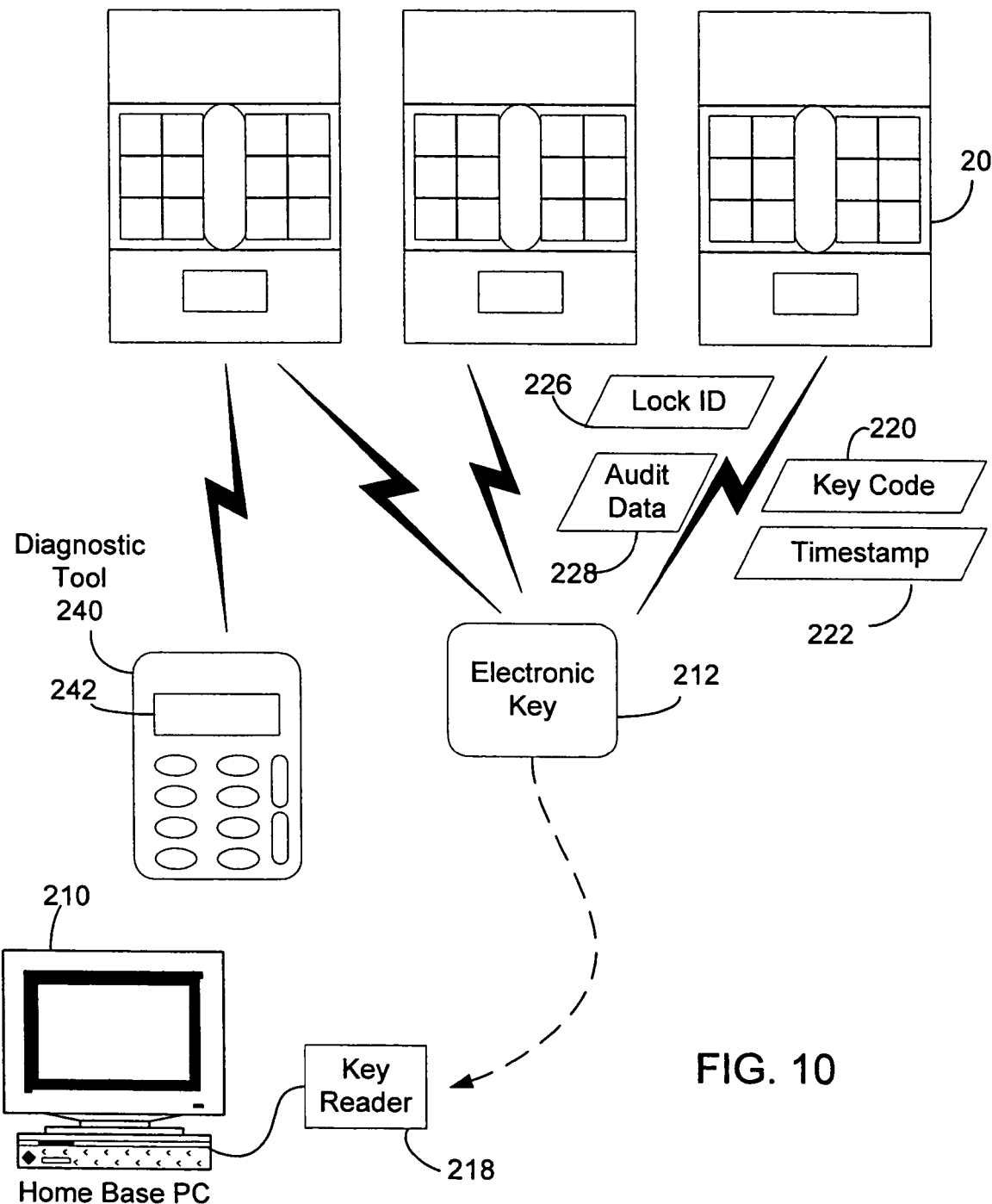
FIG. 10 is a schematic diagram showing the downloading of audit data from vending machines to an electronic key.

In accordance with an aspect and alternative embodiment of the invention, an advantage of electronic keys is that they can be used to record and collect and track the attempted accesses of locks on vending machines in the field. Keys that provide this function are of the "auto-tracking" type mentioned above. Referring to FIG. 10, with an auto-tracking key 212, each access attempt triggers an audit data event in both the electronic key and the electronic lock in the vending machine 20. To that end, a space for audit data is reserved in each of the non-volatile memories of the key 212 and the lock 48. During an access attempt, the key 212 transfers the key code 220 and a timestamp 222 to the lock. Regardless of whether the access attempt succeeds or fails, the lock stores the key code and timestamp in its audit data memory. In one implementation, the lock will filter the number of accesses from a given key in a given period (e.g., one attempt per key for every 20 minutes) so that it does not create a separate record for each access attempt. It may, however, include data in the record counting the number of access attempts from the key in the time period. This minimizes the chances that when a key is used to make many access attempts in a row it will fill the audit trail memory and erase existing records of previous access attempts. One way to set this time period in the lock is to transfer the value of the period from a key (which is in turn set by a supervisor using a PC) to the lock.

If the access attempt results in a key code mismatch or if the key is disallowed for access because an operation limit in its limit registers is reached, the access process is terminates. In either case, the lock transfers its lock ID 228 to the key 212. The key is expected to store the lock ID and the timestamp in its audit data memory as an invalid access attempt.

If, on the other hand, the access attempt results in a valid match of key code and the key has not exceeded its operation limits, the lock still transfers its lock ID to the key 212. The key 212 then stores the lock ID and timestamp in the audit data memory as a record of a proper access. In addition, as the electronic key is an auto-tracking key, the lock transfers all the audit data 228 entries in its audit data memory to the key. The data in the audit data memory includes the lock ID, a record for each access attempt that includes the entire key code (including the key ID digits) received from the key that made the access attempt, and the timestamp for that access attempt. The auto-tracking key 212 then stores the audit data 228 of the lock in its own non-volatile memory. In this regard, each key preferably is capable of uploading the audit data memories of 200-300 vending machines. This eliminates the need for a separate process or equipment in the field for performing the same data retrieving function.

When the electronic keys 212 are returned to the home base, the audit data they generated themselves and the audit data they collected from the vending machines 20 can be transferred to a central control computer 210. The audit data can be downloaded to the PC 210 by the supervisor using the key read/write device 218 that is also used for programming the electronic key.

Figure 11:
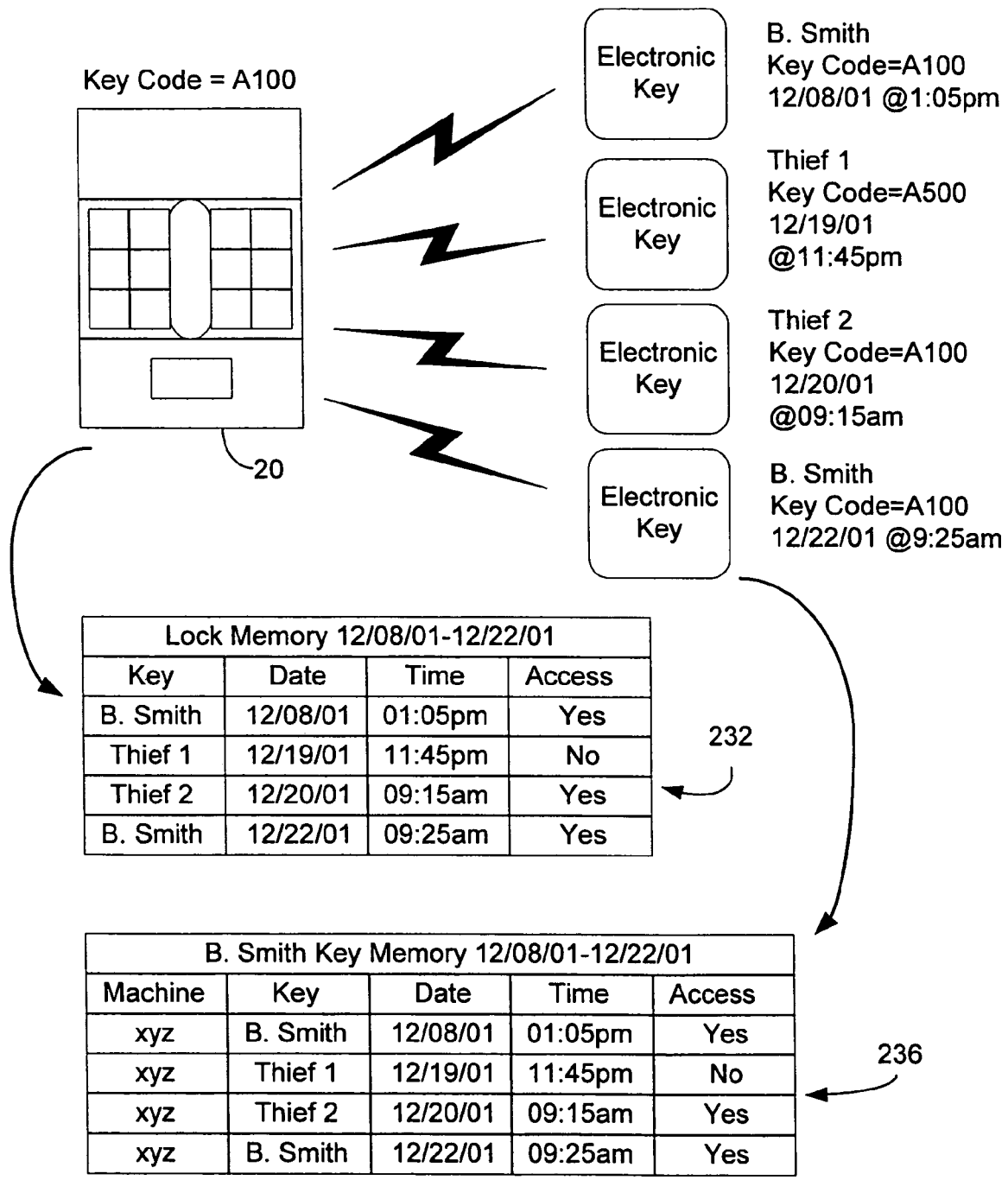
FIG. 11 is a schematic diagram showing an example of audit data uploaded from a vending machine to an electronic key.

By way of example, FIG. 11 shows exemplary audit data collected by an auto-tracking key from a vending machine. In this example, the key code stored in the lock on the vending machine is "A100". The vending machine was accessed using the auto-tracking key on Dec. 8, 2001. Since the key contains the correct key code, the access operation is successful. Thereafter, there were two unauthorized access attempts. The first unauthorized access attempt on Dec. 19, 2001 failed, because the key code ("A500") in the electronic key did not match the key code in the lock. The second unauthorized attempt on December 20 used a stolen key with the right key code and was successful. When the auto-tracking key is used on Dec. 22, 2001 to unlock the vending machine, the audit data 232 stored in the memory of the electronic lock on that vending machine are transferred to the auto-tracking key, which stores the transferred audit data in its own memory. As stored in the key, the audit data 236 identifies the vending machine from which the audit data are uploaded. The audit data 236 stored in the key are later downloading to the home base PC.

Due to the various complexities of this system concerning multiple key users, key codes, and the multiple keys sharing the same key codes, as well as the flexibility provided by the ease of changing access codes of the vending machines in the field, it is often desirable to provide simple diagnostic capabilities to the keys, electronic locks. It may also be desirable to provide special reader tools for use in the field.

In one implementation, the electronic key uses its LED light to provides several diagnostic signals to the user when its START button is pressed and when it is communicating with the electronic lock. If the key correctly communicates with the lock and the key codes match, the LED light is on continuously for about five seconds. If the key correctly communicates with the lock but the key codes do not match, the LED light flashes around five times a second for about five seconds. If the key cannot establish correct communication with the lock, the LED light is set to flash faster, such as 25 times a second, for about five seconds. If the key correctly communicates with the lock and the key codes match, but the operation limits set in the limit registers are exceeded, the LED flashes at a lower frequency, such as three times per second for about 3 seconds. If the START switch of the key is pressed and the key does not communicate with the lock and its operation limits are exceeded, the LED first flash quickly, such as 25 times per second, for up to 5 seconds, and then flash three time per second for up to three seconds.

In a preferred embodiment, a diagnostic tool 240 is used in the field to communicate with electronic locks on vending machines, which provide diagnostic information in the event of problems with the operation of the lock or the door. As shown in FIG. 10, the diagnostic tool 240 includes a display 242 that displays information read from the electronic lock. For instance, the display may show each of the access control key codes stored in the non-volatile memory of the lock, the lock ID of that lock, and any other information pertaining to the state of the electronic lock, such as an indication of whether the lock expects the door to be in a locked or unlocked state based on a position-control feedback measured by the lock circuit.

In a preferred embodiment, security measures are implemented in the electronic key concerning key tampering by replacing the battery in the key. It is possible that the employees or thieves that gain access to the electronic keys will attempt to trick the security of the system by tampering with the key. Since the key contains the clock that provides the time and date of access limiting, it is likely the users will attempt to disable or trick the clock to override the access limits. For example, if the key operation limits are set to only allow accesses between 7 AM and 6 PM, the user may attempt to disconnect the battery of the key in-between lock accesses to stop the clock in the key from counting down the time and disabling the key.

Figure 13:
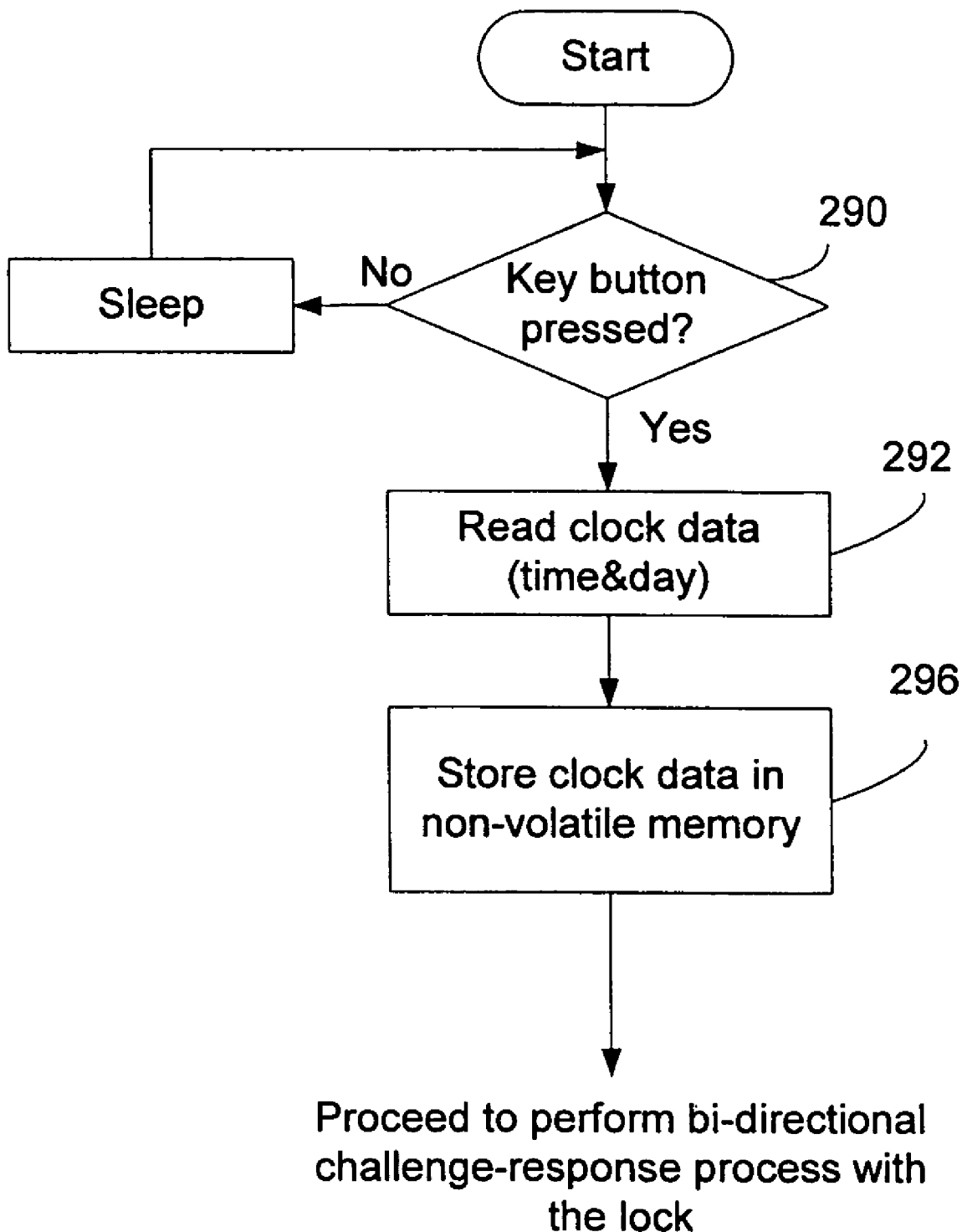
FIG. 13 is a flowchart showing an operation by an embodiment of the electronic key to back up the time and date for restoring the clock of the key in case of a faulty or removed battery.
Figure 14:
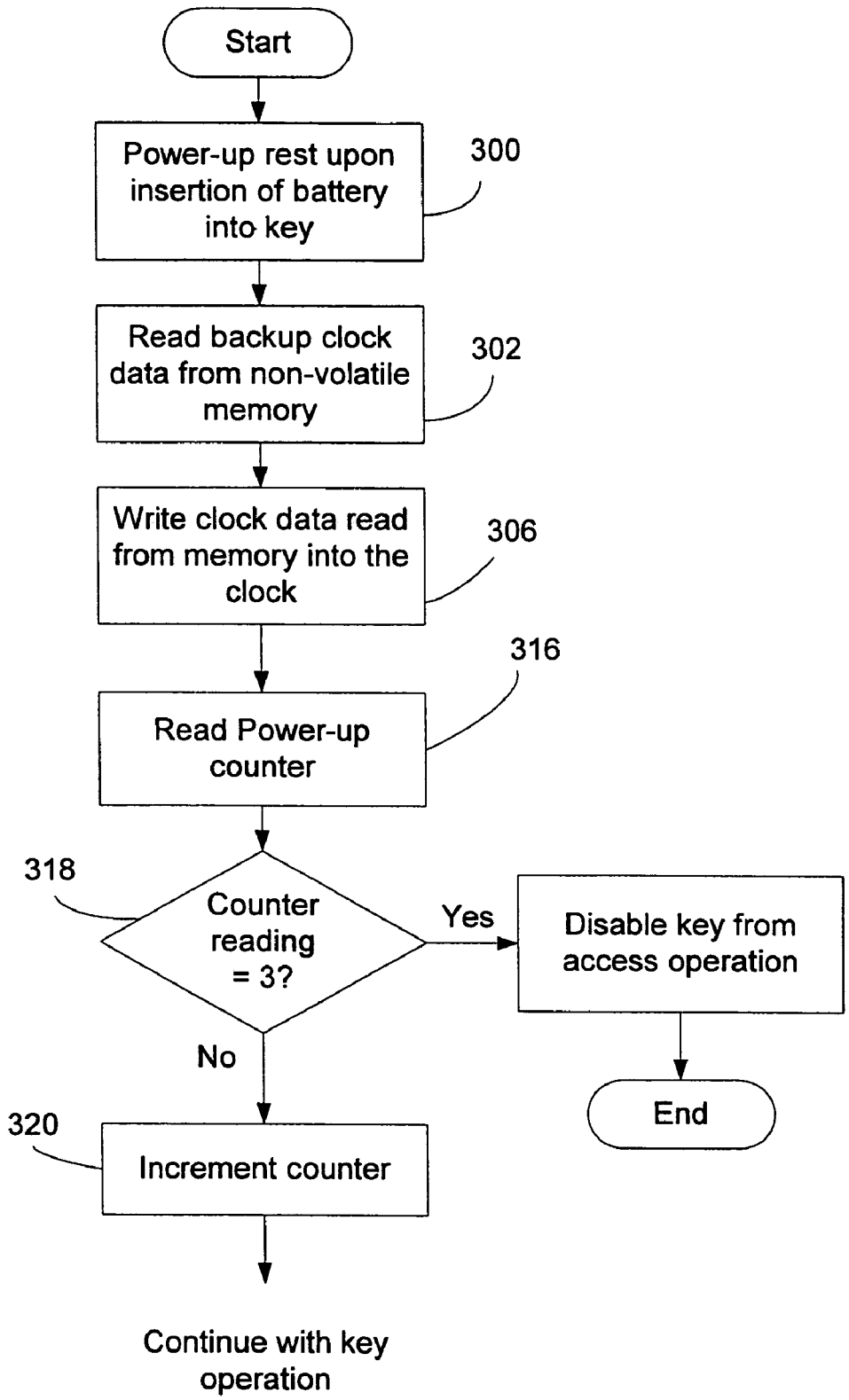
FIG. 14 is a flow chart showing an operation by the electronic key to record the number of power-up of the key to prevent tampering by battery removal.

Referring to FIG. 13, to reduce of risk of clock tampering by removing the battery, the key is programmed such that it will reset its clock back to approximately the correct time and date after the battery is reconnected. This feature is provided for both cases of the battery going low naturally or if it is tampered with by the user. To that end, each time the START button 36 of the key is pressed (step 290), the microcomputer 80 of the key reads the time and date from the clock 94 (step 292), and stores the time and date data 298 in the non-volatile memory 82 of the key (step 296). Alternatively, the key may store the time and date periodically, such as every 1-2 minutes. Referring now to FIG. 14, if the key battery is disconnected and later a battery is inserted into the key, the key starts a power-up process (step 300). The microprocessor is programmed to read the back-up time and date 298 stored in the non-volatile memory 82 (step 302) and writes that time and date into the clock 94 (step 306). The clock will then run based on the restored time and date as a substitute until the electronic key is re-docked into the cradle and the home base computer 210 stores a new accurate time and date in the clock of the key. When the restored time and date is in use, the key can still be used to access locks on the vending machines as long as the operation limits of the key are not exceeded.

In addition to the time-restoration feature, the microcomputer 80 in the key employs logic that counts the number of times the battery is removed and will immediately disable the key indefinitely if the battery is disconnected and re-connected more than a pre-selected number of times, such as three times. Specifically, the microprocessor maintains in the non-volatile memory 82 a counter 312 that counts the number of times the key has been powered up since the last docking of the key. This counter 312 is cleared each time the key is docked. Each time a battery is inserted in the key and the microcomputer 80 goes through the power-up process (step 306), the microcomputer 80 reads the counter 302 (step 316). If the microcomputer determines (step 318) that the counter reading has reached the allowed number of power-up, such as 3 times, it disables the key from any access operation. If the allowed number of power-up is not reached, the microcomputer increments the counter (step 320). Thereafter, the key continues with regular key operation, but with each access attempt the key will store a "battery removed" bit with the audit data for that access event in the memories of the lock and the key. This "battery removed" bit indicates that the time and date stamp of the access event is recorded after the key battery was disconnected, and that the accuracy of the time and date is questionable.

Figure 15:
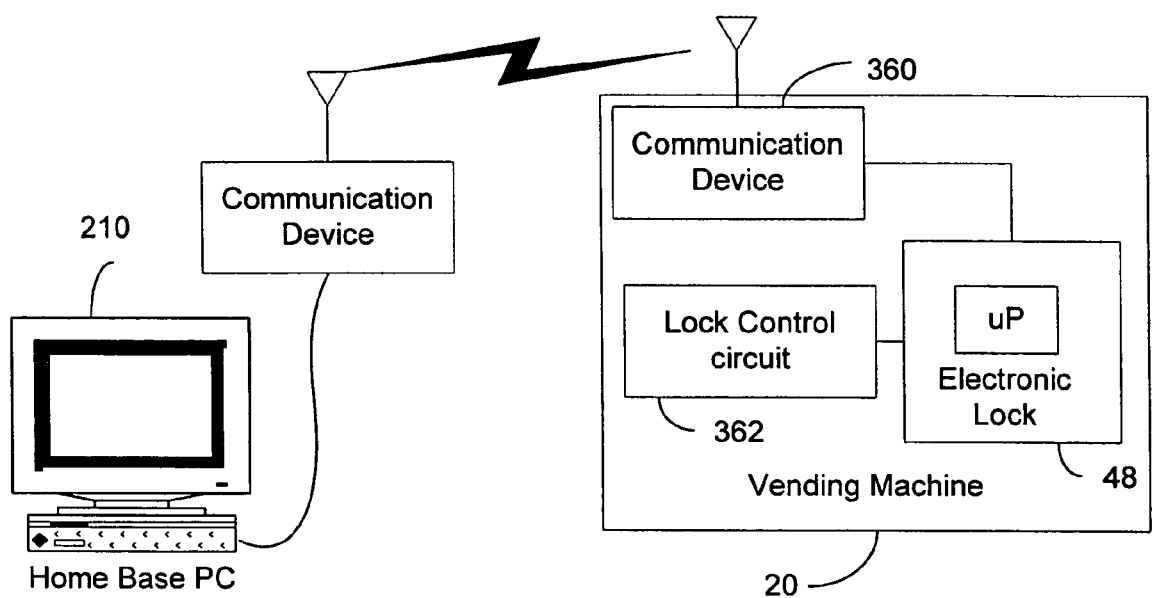
FIG. 15 is a schematic block diagram showing an embodiment of a vending machine that has a communication device that is interfaced to the electronic lock and in wireless communications with a home base for access control and auditing purposes.

Referring to FIG. 15, in accordance with a feature of an alternative embodiment, the vending machine 20 is equipped with an electronic device for communicating with the home base. The communication device 360 preferably communicates wirelessly, such as over a RF channel, to the computer 210 at the home base of the owner of the vending machine. The vending machine also includes a vendor controller electronic circuit 362 for controlling the operation of the lock 48. The vendor controller 362 is connected to the lock 48 and the communication device 360. The electronic lock 48 working together with the vendor controller 362 and the communication electronic device 360 in communication with the home base can accomplish many of the same access control and auditing functions described above and additionally some inventory and money settlement processes. For example, the communication device 360 can receive a command from the home base to disable operation of the lock 360 regardless if an electronic key with the correct key code attempts to access the vending machine. Also for example, the lock 48 can indicate to home base computer 210 through the communication device 360 which keys have attempted to access of the vending machine. This arrangement eliminates the need to use an electronic key to collect, store, and transfer the audit events to the home base via the memory and communication medium of the key.

Moreover, the communication device 360 may be used with the vendor control 362 to keep track of the inventory and the cash transactions of the machine. In many cases, when the service person (route driver) visits the machine, his job is to fill the machine and collect money. During this task, the vendor control 362 is involved in interfacing with the service person to ensure the proper resetting and settlement processes take place, and that the service person closes the door of the vending machine. The vendor controller 362 can inform the home base computer of the open/close state of the vending machine door. In the case the Route Driver does not satisfy the conditions of the vendor controller 362 by way of inventory or monetary or debit card processing, the vendor controller can send a disable signal to the electronic lock 48 so the door of the vending machine cannot be closed and locked. Thus, since the service person cannot leave a vendor unlocked, this process would force him to complete the required resetting and settlement processes so the vendor controller can allow the vendor door to be locked before the service person leaves the vending machine.

Figure 16:
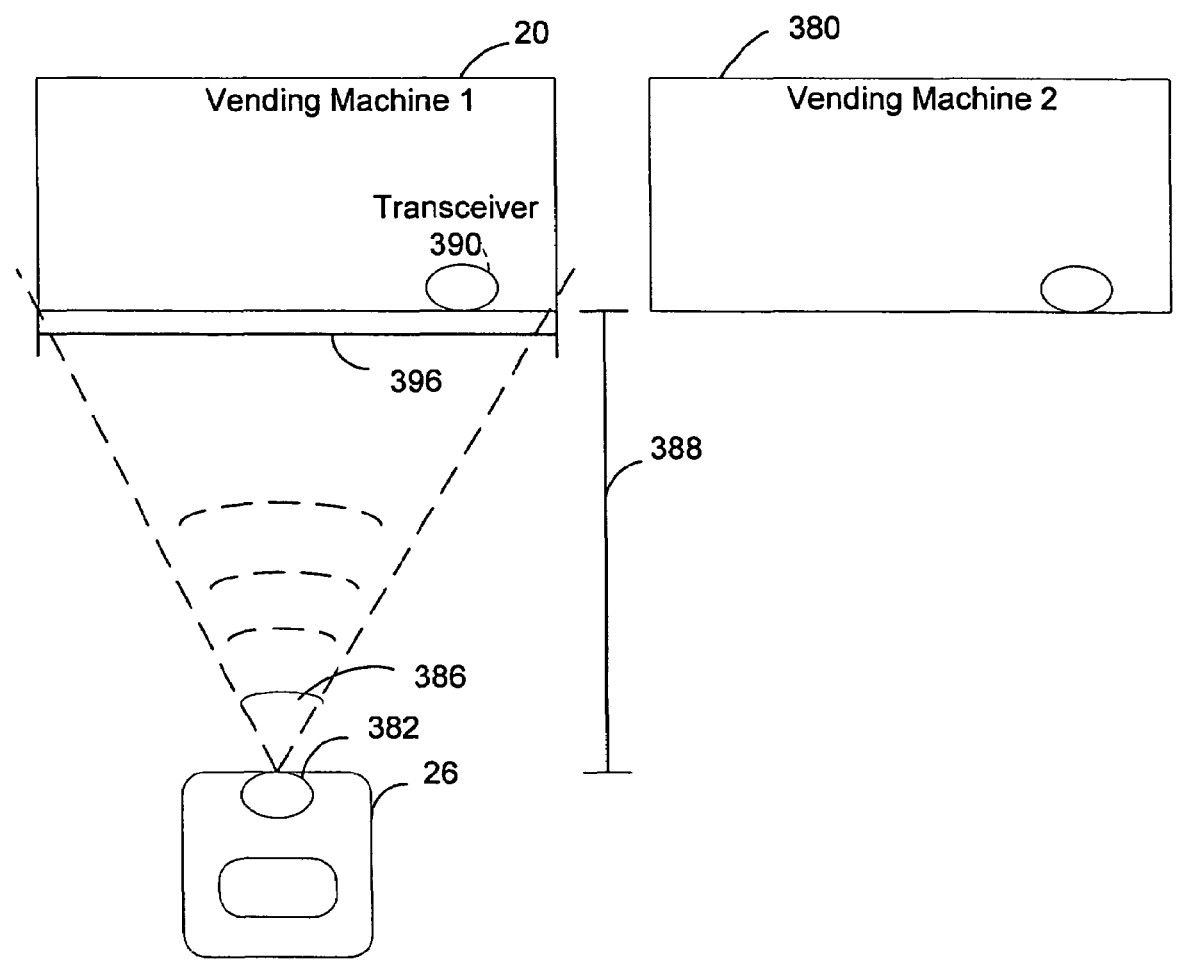
FIG. 16 is a schematic diagram showing vending machines accessible by an electronic key that has a narrow wireless signal transmission pattern to avoid accidental opening of the vending machines.

Referring now to FIG. 16, in accordance with a feature of a preferred embodiment, the wireless transceiver of the electronic key 26 is designed to have limited transmission range and angle to prevent a vending machine 380 from being accidentally opened due to receiving stray transmission from the key when the key is used to open another vending machine 20 in its vicinity. Specifically, the transmitter 382 of the key 20 has a pre-defined transmission angle 386. Also, due to the limited transmission power of the transmitter 382, the transmission from the key 26 has a limited transmission power range 388, beyond which the signal strength is generally too weak for the transceiver 390 of the electronic lock of the vending machine 20 to reliably detect. In a preferred implementation, the transmission power and the transmission angle 386 of the key 26 is selected such that the width 392 of the transmission pattern at the effective transmission range 388 is about the same or smaller than the width of the vending machine 20. As mentioned above, in a preferred implementation, the transceivers in the keys and the electronic locks on vending machines are infrared transmitters for transmitting and receiving infrared signals.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A vending machine comprising:
 a door openable to access contents of the vending machine;
 an electronic lock for unlocking the door of the vending machine, the electronic lock comprising a control circuit including a microcomputer, a non-volatile memory containing computer-executable instructions for performing a decryption operation based on an encryption code, a communication interface for receiving communications, and a learning mode activation device, the microcomputer being programmed to perform steps of receiving a learning mode activation signal from the learning mode activation device and, in response to the learning mode activation signal, receiving a first key code in an encrypted form via the communication interface, performing the decryption operation to decrypt the first key code, and storing the decrypted first key code in the non-volatile memory, wherein the vending machine further includes an electrical switch operable by a mechanical lock operable by an associated mechanical key, wherein the microcomputer of the electronic lock is further programmed to receive a trigger signal from the electrical switch when the microcomputer is set in a learning mode using the learning mode activation device and, in response to the trigger signal, enter an operation mode in which the microcomputer unlocks the door of the vending machine upon receiving a subsequent trigger signal generated by the electrical switch.

2. A vending machine as in claim 1, wherein the data received from the electronic lock include access event data regarding access attempts directed to the electronic lock of the vending machine.

3. An electronic key comprising:
 a clock;
 a microcomputer:
 a wireless communication interface for transmitting and receiving communications over a wireless band;
 a non-volatile memory having stored therein a key code, and computer executable instructions for performing an encryption operation based on an encryption code; and an activation device connected to the microcomputer and operable for generating an activation signal for triggering the microcomputer to initiate a key code transmission operation in which the microprocessor performs the encryption operation to encrypt the key code stored in the non-volatile memory, and the wireless communication interface is used to transmit the encrypted key code;

wherein the microcomputer is programmed to perform a bi-directional challenge-response process during a key transmission operation with an electronic lock on a vending machine using encrypted communications through the wireless communication interface, wherein the key contains a clock data back-up buffer, and wherein the microcomputer is further programmed to read clock data from the clock in response to receiving an activation signal from the activation device, and store the clock data into the clock data backup buffer in the non-volatile memory, and to reset the clock using the clock data stored in the clock data backup buffer when the electronic key is powered up by insertion of a battery.

4. A method of determining accessibility of an electronic lock of a vending machine using an electronic key, comprising:

encrypting, by the electronic key, a first key code together with a timestamp and a random number to form a first encrypted message, the first key code being stored in a memory of the electronic key;

transmitting, by the electronic key, the first encrypted message to the electronic lock;

decrypting, by the electronic lock, the first encrypted message received from the electronic key to extract the first key code;

comparing, by the electronic lock, the extracted first key code with a second key code stored in a memory of the electronic lock;

when the first key code matches the second key code, forming by the electronic lock a second encrypted message by encrypting the first key code together with a lock ID and the random number;

transmitting, by the electronic lock, the second encrypted message to the electronic key;

decrypting, by the electronic key, the second encrypted message to extract the first key code and the lock ID;

encrypting by the electronic key the lock ID with the random number to form a third encrypted message;

transmitting by the electronic key the third encrypted message to the electronic lock;

decrypting by the electronic lock the third encrypted message to extract the lock ID; and unlocking, by the electronic lock, a door of the vending machine when the lock ID extracted from the third encrypted message is correct.

5. A method of determining accessibility of an electronic lock of a vending machine using an electronic key, comprising:

encrypting, by the electronic key, a first key code together with a timestamp and a random number to form a first encrypted message, the first key code being stored in a memory of the electronic key;

transmitting, by the electronic key, the first encrypted message to the electronic lock;

decrypting, by the electronic lock, the first encrypted message received from the electronic key to extract the first key code;

comparing, by the electronic lock, the extracted first key code with a second key code stored in a memory of the electronic lock;

when the first key code matches the second key code, forming by the electronic lock a second encrypted message by encrypting the first key code together with a lock ID and the random number;

transmitting, by the electronic lock, the second encrypted message to the electronic key;

decrypting, by the electronic key, the second encrypted message to extract the first key code and the lock ID;

comparing by the electronic key the lock ID extracted from the second encrypted message with a list of authorized lock ID's stored in the memory of the electronic key;

if the lock ID matches one of the authorized lock ID's, encrypting by the electronic key the lock ID and the random number to form a third encrypted message;

transmitting by the electronic key the third encrypted message to the electronic lock;

decrypting, by the electronic lock, the third encrypted message to extract the lock ID; and unlocking, by the electronic lock, a door of the vending machine when the lock ID extracted from the third encrypted message is correct.

6. A method performed by an electronic key for initialization from power up, comprising:

reading a backup time and date stored in a non-volatile memory;

resetting a clock according to the backup time and date read from the non-volatile memory;

obtaining a reading of a power-up counter;

if the power-up counter reading has reached a pre-set limit, disabling the electronic key; and if the power-up counter reading has not reached a pre-set limit, incrementing the power-up counter.

* * * * *